(12) United States Patent
Zheng (10) Patent No.: US 12,438,972 B2
(45) Date of Patent: Oct. 7, 2025

(54) ELECTRONIC DEVICE COMPRISING DISPLAY MODULE AND SOUNDER

(71) Applicant: VIVO MOBILE COMMUNICATION CO., LTD., Guangdong (CN)

(72) Inventor: Ningjie Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 302 days.

(21) Appl. No.: 18/192,208

(22) Filed: Mar. 29, 2023

(65) Prior Publication Data

US 2023/0239386 A1      Jul. 27, 2023

Related U.S. Application Data

(63) Continuation of application No. PCT/CN2021/124980, filed on Oct. 20, 2021.

(30) Foreign Application Priority Data

Oct. 23, 2020  (CN) .......................... 202011146114.9

(51) Int. Cl.
  *H04M 1/03*   (2006.01)
  *H04M 1/02*   (2006.01)
  *H04R 1/02*   (2006.01)

(52) U.S. Cl.
  CPC ......... *H04M 1/035* (2013.01); *H04M 1/0264* (2013.01); *H04M 1/0277* (2013.01); *H04R 1/023* (2013.01); *H04R 2499/11* (2013.01)

(58) Field of Classification Search
  None
  See application file for complete search history.

(56) References Cited

U.S. PATENT DOCUMENTS

| | | | | |
|---|---|---|---|---|
| 2015/0237425 A1* | 8/2015 | Ou | ........................... | H04R 1/02 |
| | | | | 381/334 |
| 2017/0041693 A1 | 2/2017 | Jia et al. | | |
| 2020/0169816 A1* | 5/2020 | Kim | ....................... | H04R 1/028 |

(Continued)

FOREIGN PATENT DOCUMENTS

| | | |
|---|---|---|
| CN | 106954104 A | 7/2017 |
| CN | 108370394 A | 8/2018 |

(Continued)

*Primary Examiner* — Allen L Parker
*Assistant Examiner* — Christopher L Augustin
(74) *Attorney, Agent, or Firm* — Price Heneveld LLP (57) ABSTRACT

An electronic device is provided. The electronic device includes: a display module, a middle frame, a sounder, a first structural member, a first circuit board, and a rear cover, where the middle frame is provided with an accommodation groove, and the display module is disposed in the accommodation groove; a side of the middle frame away from the display module is provided with a mounting groove, and the sounder is at least partially disposed in the mounting groove; the first structural member and the rear cover are disposed at the side of the middle frame away from the display module, a first gap is present between the first structural member and the rear cover, and the first structural member and the middle frame enclose a first sound chamber of the sounder, or the first structural member and the first circuit board enclose a first sound chamber of the sounder.

11 Claims, 8 Drawing Sheets

(56) References Cited

U.S. PATENT DOCUMENTS

| | | | |
|---|---|---|---|
| 2020/0177979 A1* | 6/2020 | Cho | H04M 1/0274 |
| 2020/0267248 A1 | 8/2020 | Park et al. | |
| 2021/0112342 A1* | 4/2021 | Xu | G06F 1/1626 |
| 2022/0337689 A1 | 10/2022 | Li et al. | |

FOREIGN PATENT DOCUMENTS

| | | |
|---|---|---|
| CN | 108494906 A | 9/2018 |
| CN | 207947905 U | 10/2018 |
| CN | 105657616 B * | 1/2019 |
| CN | 109218940 A | 1/2019 |
| CN | 109547602 A | 3/2019 |
| CN | 111262980 A | 6/2020 |
| CN | 210724969 U | 6/2020 |
| CN | 211720586 U | 10/2020 |
| CN | 112261186 A | 1/2021 |

\* cited by examiner

ELECTRONIC DEVICE COMPRISING DISPLAY MODULE AND SOUNDER

CROSS-REFERENCE TO RELATED APPLICATIONS

This application is a continuation application of PCT Application No. PCT/CN2021/124980 filed on Oct. 20, 2021, which claims priority to Chinese Patent Application No. 202011146114.9, filed in China on Oct. 23, 2020, the disclosures of which are incorporated herein by reference in their entireties.

TECHNICAL FIELD

This application pertains to the field of communications technologies, and specifically relates to an electronic device.

BACKGROUND

Currently, smart phones on the market are increasingly focusing on entertainment experience functions. The demand for stereo sound in mobile phones is getting higher and higher. In scenes such as videos, movies, and games, mobile phones need to have a stereo function to improve audio experience.

During implementation of stereo sound, if a speaker module is used, relatively large space is occupied by the speaker module, thereby affecting arrangement of other devices in the mobile phone, even affecting a battery capacity; and if a speaker is directly mounted and a cavity in the entire machine is used as a sound chamber of the speaker, the working speaker can cause the battery cover and other assemblies to vibrate violently, thus affecting use experience of the phone.

SUMMARY

An embodiment of this application provides an electronic device, including: a display module, a middle frame, a sounder, a first structural member, a first circuit board, and a rear cover, where the middle frame is provided with an accommodation groove, and the display module is disposed in the accommodation groove; a side of the middle frame away from the display module is provided with a mounting groove, and the sounder is at least partially disposed in the mounting groove; the first structural member and the rear cover are disposed at the side of the middle frame away from the display module, the first structural member is located between the rear cover and the middle frame, and a first gap is present between the first structural member and the rear cover, where the first structural member and the middle frame enclose a first sound chamber of the sounder, and the first circuit board is located in the first sound chamber; or the first circuit board is located between the first structural member and the middle frame, a fixing groove is provided on the first circuit board, the sounder is partially disposed in the fixing groove, and the first structural member and the first circuit board enclose a first sound chamber of the sounder.

Optionally, a second gap is present between the display module and the middle frame, where the second gap forms a sound guiding channel, and the sound guiding channel communicates with the mounting groove.

Optionally, the electronic device further includes a first sealing member, where in the case that the first structural member and the middle frame enclose a first sound chamber of the sounder, the first structural member and the middle frame are hermetically connected by the first sealing member, and in the case that the first structural member and the first circuit board enclose a first sound chamber of the sounder, the first structural member and the first circuit board are hermetically connected by the first sealing member.

Optionally, the electronic device further includes a first connecting member and a second sealing member, where the first structural member is provided with a mounting hole, the middle frame is provided with a connecting portion, the connecting portion is corresponding to the mounting hole, and the first connecting member passes through the mounting hole to connect to the connecting portion; and the second sealing member is disposed at a side of the mounting hole away from the connecting portion, and the second sealing member covers the mounting hole.

Optionally, the electronic device further includes a third sealing member, where in the case that the first structural member and the first circuit board enclose a first sound chamber of the sounder, the first circuit board and the middle frame are hermetically connected by the third sealing member.

Optionally, the first structural member is further provided with a leak hole, the leak hole communicates with the first sound chamber, and a damping screen is disposed in the leak hole.

Optionally, a rib is formed at an edge of the first structural member, and in the case that the first structural member and the middle frame enclose a first sound chamber of the sounder, the first sealing member is disposed on a contact surface between the rib and the middle frame, and in the case that the first structural member and the first circuit board enclose a first sound chamber of the sounder, the first sealing member is disposed on a contact surface between the rib and the first circuit board.

Optionally, the electronic device further includes:
a camera, where the camera is disposed in the first sound chamber, and the first structural member is further provided with a camera through hole, where the camera passes through the camera through hole to protrude from a surface of the first structural member, and a third sealing member is further provided on a contact surface between the camera and the first structural member.

Optionally, the electronic device further includes:
a flexible circuit board, where in the case that the first structural member and the middle frame enclose a first sound chamber of the sounder, part of the flexible circuit board passes between the first sealing member and the middle frame to enter the first sound chamber to electrically connect to the first circuit board.

Optionally, the electronic device further includes:
a flexible circuit board, where in the case that the first structural member and the first circuit board enclose a first sound chamber of the sounder, a notch is provided on the first structural member, part of the first circuit board is exposed from the first structural member via the notch, and the flexible circuit board is connected to the part of the first circuit board exposed via the notch.

Optionally, the first sealing member and the third sealing member are foam, and the second sealing member is polyester film (PET).

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that a number used in this way may be interchangeable in an appropriate case, so that the embodiments of this application can be implemented in a sequence other than those shown or described herein. Objects distinguished by "first", "second", and the like are usually of one type, and a quantity of objects is not limited. For example, a first object may be one or more than one. In addition, in the specification and the claims, "and/or" represents at least one of the connected objects, and the character "/" usually represents an "or" relationship between the associated objects.

With reference to the accompanying drawings, the following describes in detail the electronic device provided in embodiments of this application by using a specific embodiment and an application scenario thereof.

In the prior art, a speaker module is generally disposed at the top of an electronic device. However, the inventors of this application have found: many components are disposed on the top of the electronic device, including a main board, a camera assembly, and the like, and in a case that the speaker module is used, too much space is occupied by the speaker module due to its large volume of the speaker module, and therefore, arrangement of the camera assembly is affected, and even a battery allowed to be mounted needs to have relatively small volume because excessive internal space of the electronic device is occupied, and correspondingly the battery has relatively low capacity; and if a speaker unit is used on the top of the electronic device, in order to ensure a certain sound effect, the internal cavity of the electronic device needs to be used as a sound chamber of the speaker unit, which causes a battery cover to vibrate violently when the speaker unit is working, affecting use experience of the mobile phone.

Figure 1:
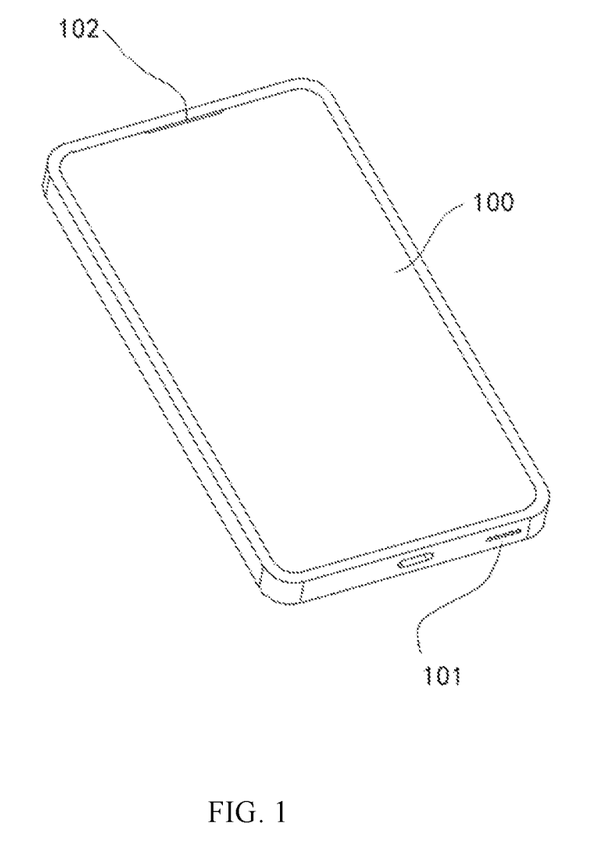
FIG. 1 is a schematic diagram of an electronic device according to an embodiment of this application.

Refer to FIG. 1, which is a schematic diagram of an electronic device according to an embodiment of this application. As shown in FIG. 1, an embodiment of this application provides an electronic device. The electronic device 100 is provided with a sounder 105 at the top, and the sounder 105 transmits sound outside through a second gap 102 in the electronic device 100. In this embodiment of this application, a cavity with a specified volume is formed by internal components of the electronic device 100, implementing a stereo sound without occupying too much space or causing a battery cover to vibrate. The electronic device 100 may specifically be a mobile phone, a tablet, or the like.

In an embodiment of this application, the electronic device may include: a display module, a middle frame, a sounder, a first structural member, a first circuit board, and a rear cover, where the middle frame is provided with an accommodation groove, and the display module is disposed in the accommodation groove; a side of the middle frame away from the display module is provided with a mounting groove, and the sounder is at least partially disposed in the mounting groove; the first structural member and the rear cover are disposed at the side of the middle frame away from the display module, the first structural member is located between the rear cover and the middle frame, and a first gap is present between the first structural member and the rear cover.

In an optional implementation, the first structural member and the middle frame enclose a first sound chamber of the sounder, and the first circuit board is located in the first sound chamber.

In another optional implementation, the first circuit board is located between the first structural member and the middle frame, a fixing groove is provided on the first circuit board, the sounder is partially disposed in the fixing groove, and the first structural member and the first circuit board enclose a first sound chamber of the sounder.

The following describes the foregoing two implementations with reference to the accompanying drawings.

Figure 2:
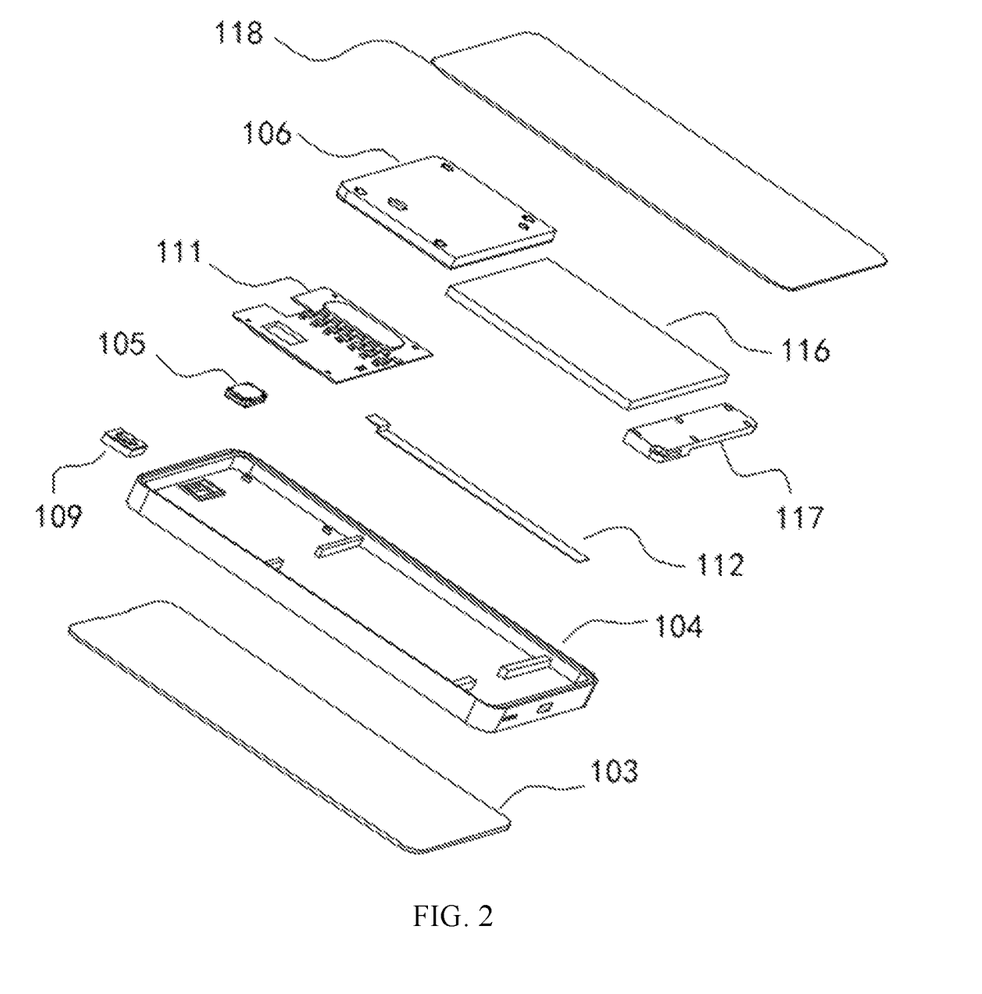
FIG. 2 is an exploded view of an electronic device according to an embodiment of this application.
Figure 3:
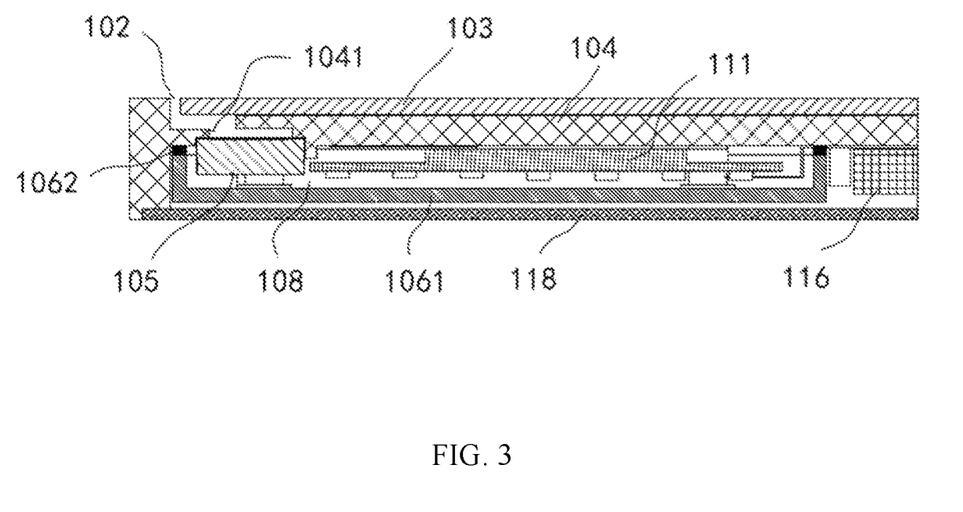
FIG. 3 is a first sectional view of a sounder according to an embodiment of this application.

Refer to FIG. 2 to FIG. 3. FIG. 2 is an exploded view of an electronic device according to an embodiment of this application, and FIG. 3 is a first sectional view of a sounder according to an embodiment of this application. As shown in FIG. 2 and FIG. 3, specifically, the electronic device 100 in the embodiments of this application may include a display module 103, a middle frame 104, a sounder 105, a first structural member 1061, a first circuit board 111, and a rear cover 118, where the middle frame 104 is provided with an accommodation groove at the front, and the display module 103 is disposed in the accommodation groove provided at the front of the middle frame 104; a lateral side of the middle frame 104 away from the display module 103 is provided with a mounting groove 1041, the sounder 105 is disposed at the back of the middle frame 104, and the sounder 105 is at least partially embedded in the mounting groove 1041 so as to prevent the sounder 105 from sliding; the first structural member 1061 and the rear cover 118 are disposed at a side of the middle frame 104 away from the display module 103, the first structural member 1061 and the middle frame 104 enclose a first sound chamber 108 of the sounder 105, and the first circuit board 111 is located inside the first sound chamber 108; and in addition, the first structural member 1061 is located between the rear cover 118 and the middle frame 104, and a first gap is present between the first structural member 1061 and the rear cover 118. With the first gap, the first structural member 1061 and the rear cover 118 are separated.

In an embodiment of this application, the sounder 105 may be a speaker, the display module 103 may include a screen, and the first structural member 1061 is an internal structural member in the electronic device, and may specifically be a cover, a circuit board, or another component.

Optionally, in an embodiment of this application, a second gap 102 is present between the display module 103 and the middle frame 104, and the second gap 102 forms a sound guiding channel, where the sound guiding channel communicates with the mounting groove 1041, such that the sounder 105 can transmit sound to the outside of the electronic device 100 through the sound guiding channel, implementing sound output.

In this way, instead of designing a separate speaker module, embodiments of this application use a single sounder 105, which does not occupy component stacking space at the top of the middle frame 104. Furthermore, the internal space of the electronic device 100 is appropriately utilized by using the original components of the electronic device 100 to form the first sound chamber 108 with a larger volume, such that the sounder 105 has more excellent performance and a better stereo effect, avoiding a problem of a large speaker performance difference between the top and the bottom of the electronic device 100. In addition, the first sound chamber 108 does not contact the rear cover 118 fixed at the back of the middle frame 104, and therefore, sound waves are hardly transmitted to the rear cover 118 when the speaker is working, avoiding violent vibration of the rear cover 118 and improving user experience.

Figure 4:
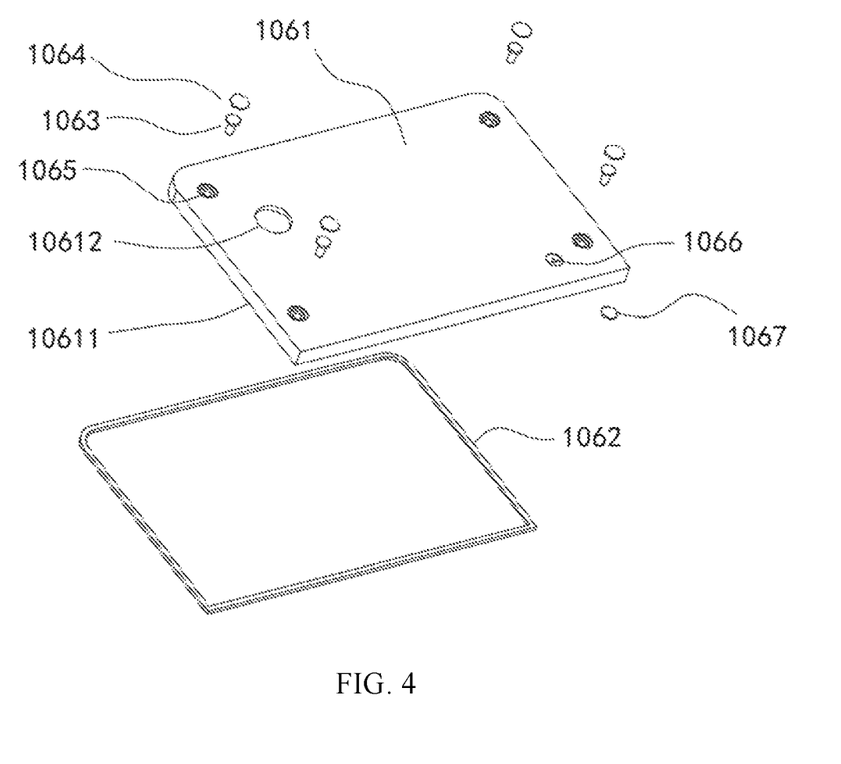
FIG. 4 is a first exploded view of a structural assembly according to an embodiment of this application.

Refer to FIG. 4, which is a first exploded view of a structural assembly according to an embodiment of this application. As shown in FIG. 2 and FIG. 4, in an embodiment of this application, the electronic device includes a structural assembly 106, and the structural assembly 106 further includes a first sealing member 1062 apart from the first structural member 1061. In a case that the first structural member 1061 and the middle frame 104 enclose a first sound chamber 108 of the sounder 105, the first sealing member 1062 is disposed on a contact surface between the first structural member 1061 and the middle frame 104. In this way, a sealed first sound chamber 108 is formed between the first structural member 1061 and the middle frame 104.

Optionally, the first sealing member 1062 may be in a same shape as that of an outer periphery of the first structural member 1061, for example, a rectangle. A material of the first sealing member 1062 may be foam, and certainly, can alternatively be elastic rubber or another sealing material.

Figure 5:
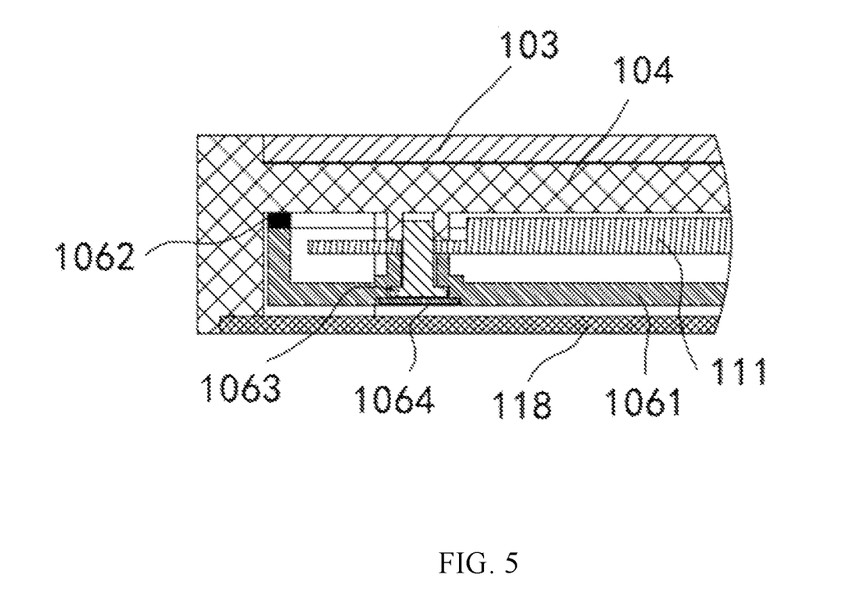
FIG. 5 is a sectional view of a connection position between a first structural member and a middle frame according to an embodiment of this application.
Figure 13:
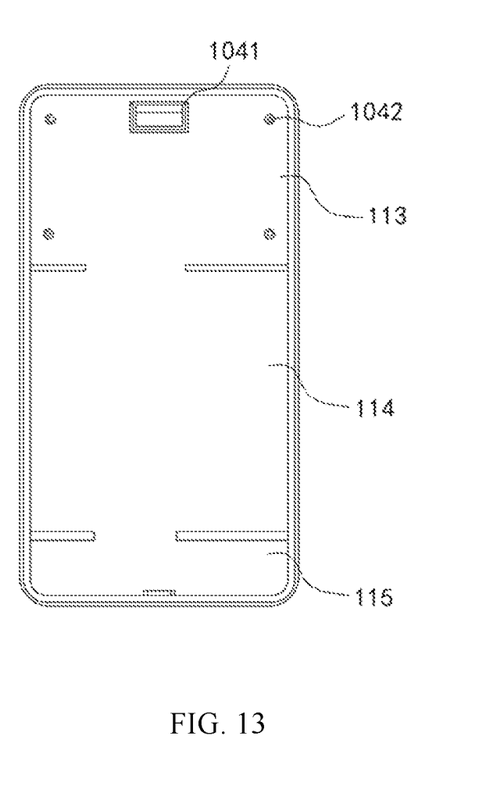
FIG. 13 is a rear view of a middle frame according to an embodiment of this application.

Refer to FIG. 5, which is a sectional view of a connection position between the first structural member and the middle frame according to an embodiment of this application. As shown in FIG. 4, FIG. 5, and FIG. 13, in an embodiment of this application, the structural assembly 106 of the electronic device 100 may further include first connecting members 1063 and second sealing members 1064. The first structural member 1061 is provided with multiple mounting holes 1065, and connecting portions 1042 are correspondingly provided at the back of the middle frame 104. The first connecting members 1063 are fastened to the connecting portions 1042 through the mounting holes 1065, so as to implement fixed connection between the first structural member 1061 and the middle frame 104. As a gap may be present between the first connecting member 1063 and the connecting portion 1042, in order to prevent the first sound chamber 108 from communicating with the outside, optionally, the second sealing member 1064 is attached to a side of each mounting hole 1065 away from the connecting portion 1042, and the second sealing members 1064 cover the mounting holes 1065 to seal the connection, thereby achieving better sound quality and reducing vibration interference to components outside the first sound chamber 108. Optionally, the second sealing member 1064 is a PET film. In an optional implementation, the first connecting members 1063 may be screws, and correspondingly the mounting holes 1065 serve as screw holes, and the connecting portions 1042 serve as screw posts, which are columns provided with a screw hole. In another optional implementation, the first connecting members 1063 may be buckles, the connecting portions 1042 serve as catches, and the buckles pass through the mounting holes 1065 to fit with the catches, so as to implement fixed connection.

Continue to refer to FIG. 4. In an embodiment of this application, a leak hole 1066 is further provided on the first structural member 1061, and a damping screen 1067 is disposed inside the leak hole 1066 or on at least one of two ends of the leak hole 1066. The leak hole 1066 and the damping screen 1067 are configured to adjust air pressure in the first sound chamber 108, so as to avoid excessive air pressure which causes a noise problem.

Continue to refer to FIG. 4. In an embodiment of this application, a rib 10611 is formed at an edge of the first structural member 1061. With the rib 10611, the first structural member 1061 is in a box shape, such that the first structural member 1061 can form an enclosed space with the back of the middle frame 104, and the first sound chamber 108 is further obtained by sealing the enclosed space. The first sealing member 1062 is disposed on a contact surface between the rib 10611 of the first structural member 1061 and the middle frame 104, and in a case that a pressing force is applied to the first structural member 1061, the first sealing member 1062 can have a good sealing effect.

Figure 6:
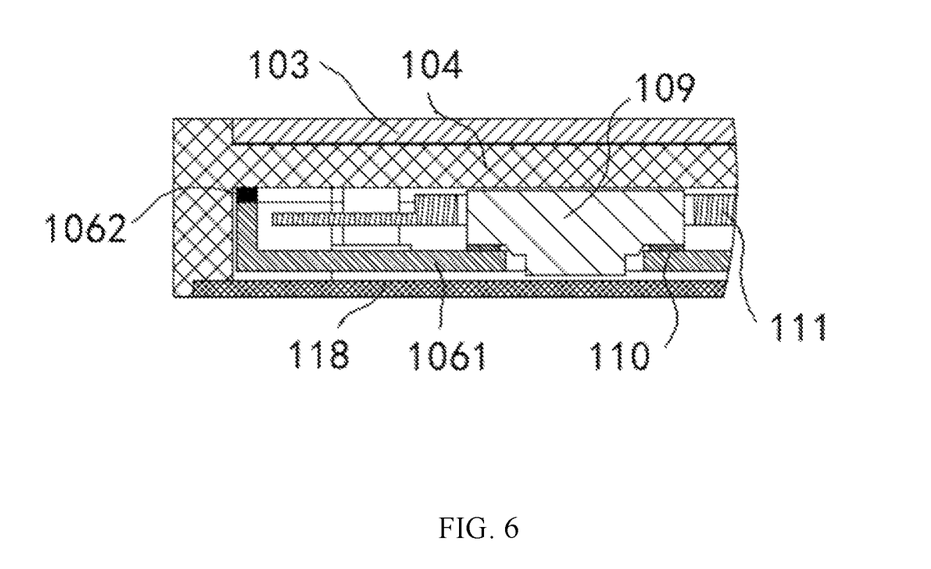
FIG. 6 is a sectional view at a camera according to an embodiment of this application.

Refer to FIG. 6. FIG. 6 is a sectional view at a camera according to an embodiment of this application. As shown in FIG. 6, in an embodiment of this application, the electronic device 100 further includes a camera 109. The camera 109 is disposed in the enclosed space, that is, the first sound chamber 108, formed by the first structural member 1061 and the middle frame 104. In addition, a camera through hole 10612 is further provided on the first structural member 1061, where a collection end of the camera 109 passes through the camera through hole 10612 to protrude from a surface of the first structural member 1061, to collect optical signals. To ensure a sealing effect of the first sound chamber 108, a camera sealing member 110 is further provided on a contact surface between the camera 109 and the first structure member 1061. The camera sealing member 110 may be annular, and the camera through hole 10612 is located in an area enclosed by the camera sealing member 110. In a case that the first structural member 1061 applies a pressing force to the camera 109, the camera sealing member 110 can have a good sealing effect. Optionally, the camera sealing member 110 may be foam, or may be elastic rubber or another sealing material.

Figure 7:
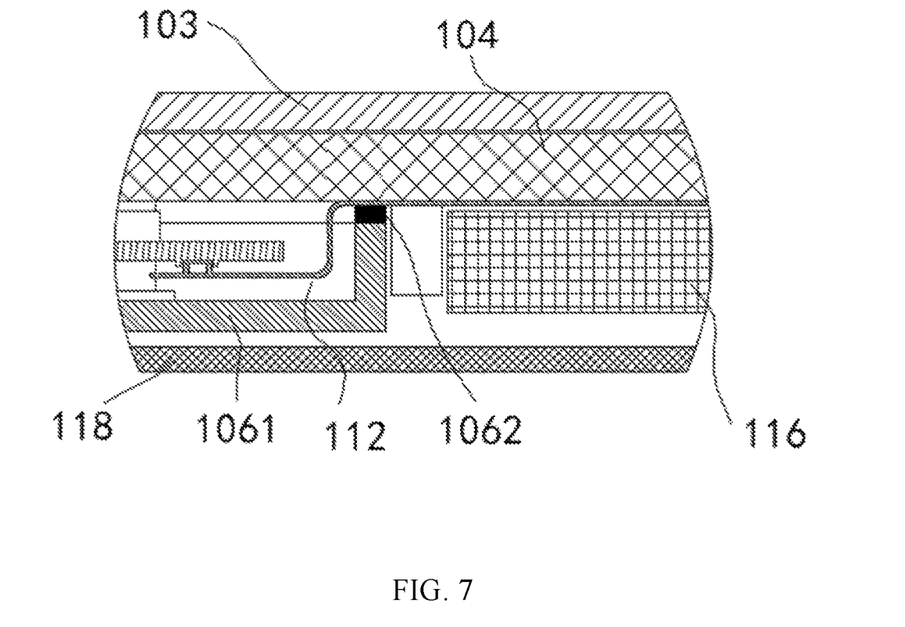
FIG. 7 is a first schematic diagram of connection between a first circuit board and a flexible circuit board according to an embodiment of this application.

Refer to FIG. 7. FIG. 7 is a first schematic diagram of connection between the first circuit board and a flexible circuit board according to an embodiment of this application. As shown in FIG. 7, in an embodiment of this application, the electronic device 100 further includes the flexible circuit board 112, and the first circuit board 111 is disposed in the space enclosed by the first structural member 1061 and the middle frame 104, that is, the first sound chamber 108. Generally, the flexible circuit board 112 needs to connect to the first circuit board 111. The first circuit board 111 is covered by the first structural member 1061, and therefore, to seal a connection between the flexible circuit board 112 and the first circuit board 111, part of the flexible circuit board 112 outside the first structural member 1061 adheres to the back of the middle frame 104, and another part of the flexible circuit board 112 passes between the first sealing member 1062 and the middle frame 104 to enter the first sound chamber 108 and then climb up to the first circuit board 111 to connect to the first circuit board 111. As the flexible circuit board 112 is relatively thin, in a case that the first structural member 1061 applies a pressing force, the first sealing member 1062 can still have a relatively good sealing effect, thereby solving the leakage problem. Optionally, the first structural member 1061 may be another circuit board than the first circuit board 111, or may be a shelf board, a shield cover structure of the first circuit board 111, or the like.

Figure 8:
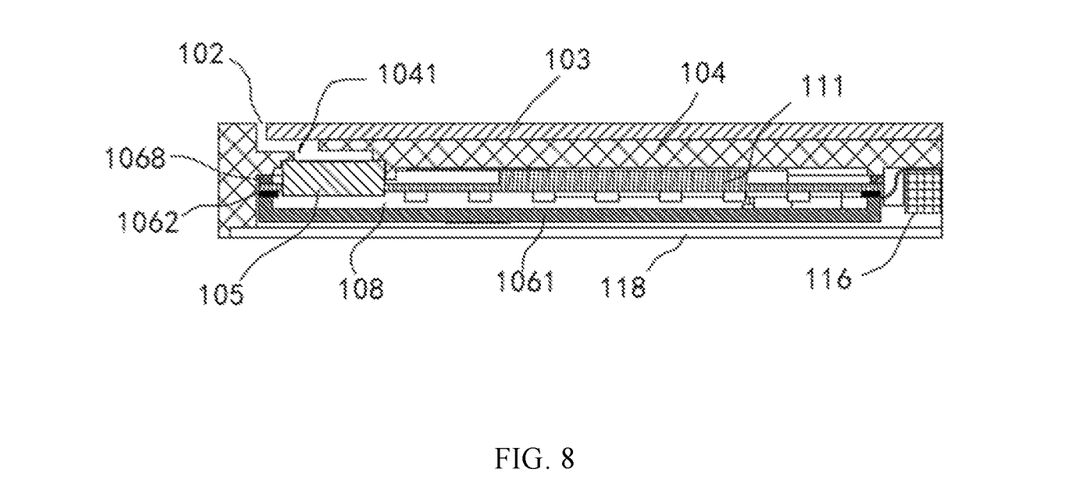
FIG. 8 is a second sectional view of a sounder according to an embodiment of this application.

Refer to FIG. 8. FIG. 8 is a second sectional view of a sounder according to an embodiment of this application. As shown in FIG. 8, in another implementation of this application, different from the structure shown in FIG. 3, the first circuit board 111 is located between the first structural member 1061 and the middle frame 104. A fixing groove is provided on the first circuit board 111, and the sounder 105 is partially disposed in the fixing groove to reduce assembling thickness of the electronic device 100. In addition, the first structural member 1061 and the first circuit board 111 enclose the first sound chamber 108 of the sounder.

In a case that the first structural member 1061 and the first circuit board 111 enclose the first sound chamber 108 of the sounder 105, to ensure tightness of the first sound chamber 108, the first sealing member 1062 is used to hermetically connect the first structural member 1061 and the first circuit board 111. Specifically, a rib is formed at an edge of the first structural member, and the first sealing member 1062 is disposed on a contact surface between the rib and the first circuit board 111; and the first circuit board 111 and the middle frame 104 are hermetically connected by the third sealing member 1068. Optionally, the third sealing member 1068 in use may be foam, or certainly, may also be a component made of elastic rubber or another sealing material.

Figure 9:
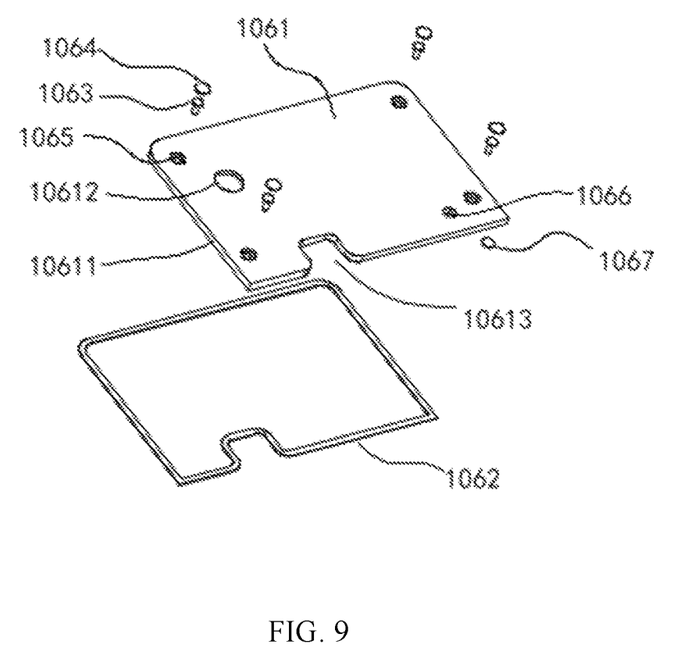
FIG. 9 is a second exploded view of a structural assembly according to an embodiment of this application.
Figure 10:
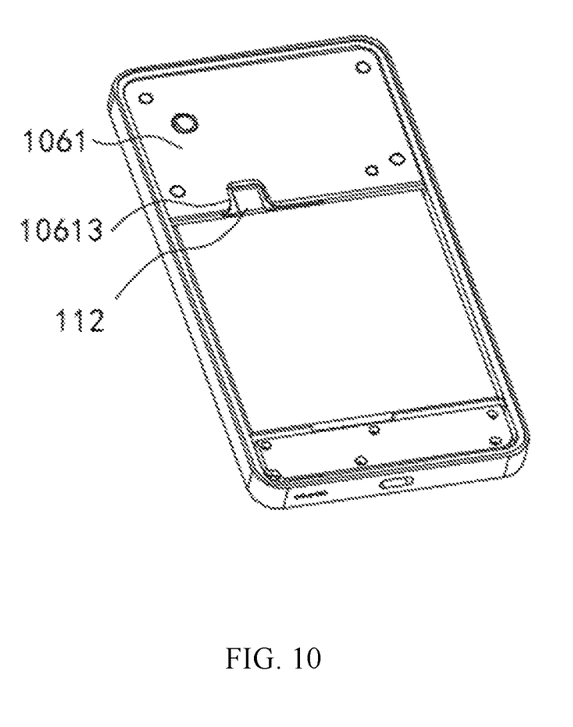
FIG. 10 is a schematic diagram at a notch position of a first structural member according to an embodiment of this application.
Figure 11:
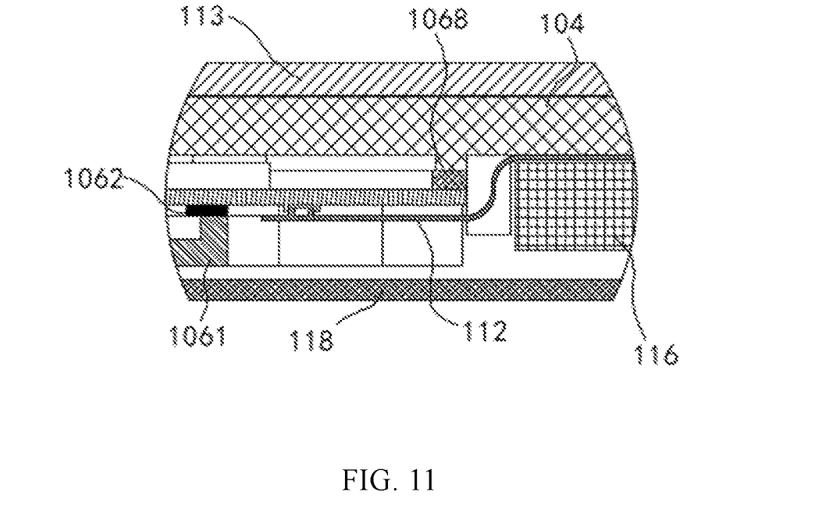
FIG. 11 is a second schematic diagram of connection between a first circuit board and a flexible circuit board according to an embodiment of this application.

Refer to FIG. 9 to FIG. 11. FIG. 9 is a second exploded view of a structural assembly according to an embodiment of this application, FIG. 10 is a schematic diagram of a notch position of the first structural member according to an embodiment of this application, and FIG. 11 is a second schematic diagram of connection between the first circuit board and the flexible circuit board according to an embodiment of this application. As shown in FIG. 9 to FIG. 11, in an embodiment of this application, optionally, in the case that the first structural member 1061 and the first circuit board 111 enclose the first sound chamber 108 of the sounder 105, a notch 10613 is further provided on the first structural member 1061. Due to the existence of the notch 10613, part of the first circuit board 111 at the notch 10613 is not covered by the first structural member 1061, that is, the first circuit board 111 is partially exposed from the first structural member 1061 via the notch 10613, and in this case, the flexible circuit board 112 can directly connect to the first circuit board 111 at the notch 10613, thereby simplifying an assembly process.

As for other components and connecting manners thereof in this implementation, reference can be made to the descriptions in the previous implementation, and details are not repeated herein.

Figure 12:
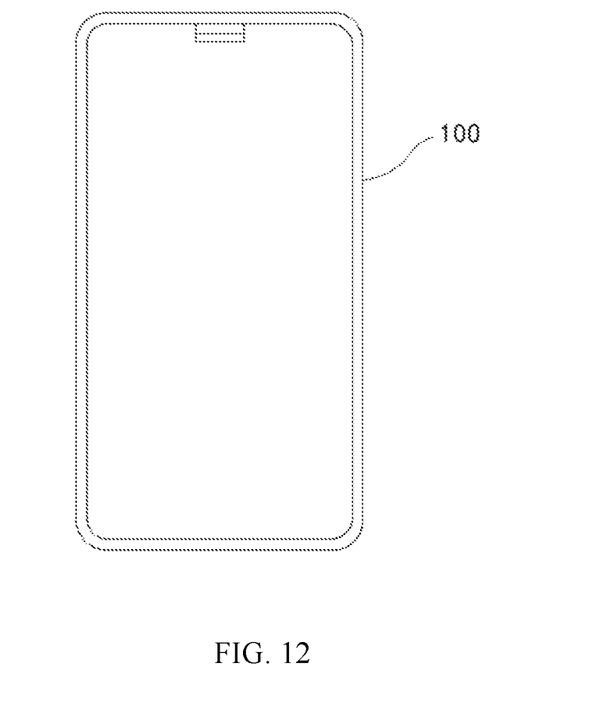
FIG. 12 is a front view of a middle frame according to an embodiment of this application.

Refer to FIG. 12 and FIG. 13. FIG. 12 is a front view of a middle frame according to an embodiment of this application, and FIG. 13 is a rear view of a middle frame according to an embodiment of this application. As shown in FIG. 12 to FIG. 13, the back of the middle frame 104 is divided into three areas, that is, a top area 113, a middle area 114, and a bottom area 115. A speaker module 117 is placed in the bottom area 115 of the electronic device 100, and the speaker module 117 transmits sound outside through a speaker outlet 101 at the bottom of the electronic device 100. Though occupying relatively large space, the speaker module has little influence due to being arranged at the bottom of the electronic device 100. Both the sounder 105 and the first structural member 1061 are disposed in the top area 113 of the middle frame 104, and a single speaker instead of a speaker module is used in this embodiment of this application. Therefore, relatively small space is occupied by the sounder 105 in the top area 113, such that the space in the middle area 114 is correspondingly increased. Accordingly, a battery 116 with a relatively high capacity can be placed in the middle area 114, thereby improving battery life of the electronic device. In addition, the sounder 105 in the top area 113 cooperates with the speaker module 117 in the bottom area 115 to generate a stereo sound effect.

In embodiments of this application, components such as the middle frame and the cover assembly of the electronic device form the first sound chamber and a sealed second sound chamber, such that the volume of the sound chamber is enlarged while space occupied by the speaker is reduced. This can effectively enhance speaker performance, improve sound quality, and suppress the undesirable phenomenon that the speaker causes the battery cover to vibrate.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the method and apparatus in the embodiments of this application is not limited to performing a function in a sequence shown or discussed, and may further include performing a function in a basically simultaneous manner or in a reverse sequence based on a function involved. For example, the described method may be performed in a different sequence, and various steps may be added, omitted, or combined. In addition, features described with reference to some examples may be combined in other examples.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. An electronic device, comprising a display module, a middle frame, a sounder, a first structural member, a first circuit board, and a rear cover, wherein the middle frame is provided with an accommodation groove, and the display module is disposed in the accommodation groove; a side of the middle frame away from the display module is provided with a mounting groove, and the sounder is at least partially disposed in the mounting groove; the first structural member and the rear cover are disposed at the side of the middle frame away from the display module, the first structural member is located between the rear cover and the middle frame, and a first gap is present between the first structural member and the rear cover, wherein the first structural member and the middle frame enclose a first sound chamber of the sounder, and the first circuit board is located in the first sound chamber; or the first circuit board is located between the first structural member and the middle frame, a fixing groove is provided on the first circuit board, the sounder is partially disposed in the fixing groove, and the first structural member and the first circuit board enclose a first sound chamber of the sounder;

wherein the electronic device further comprises:

a camera, wherein the camera is disposed in the first sound chamber, and the first structural member is further provided with a camera through hole, wherein the camera passes through the camera through hole to protrude from a surface of the first structural member.

2. The electronic device according to claim 1, wherein a second gap is present between the display module and the middle frame, and the second gap forms a sound guiding channel, wherein the sound guiding channel communicates with the mounting groove.

3. The electronic device according to claim 1, further comprising a first sealing member, wherein in the case that the first structural member and the middle frame enclose the first sound chamber of the sounder, the first structural member and the middle frame are hermetically connected by the first sealing member, and in the case that the first structural member and the first circuit board enclose the first sound chamber of the sounder, the first structural member and the first circuit board are hermetically connected by the first sealing member.

4. The electronic device according to claim 3, further comprising a first connecting member and a second sealing member, wherein the first structural member is provided with a mounting hole, the middle frame is provided with a connecting portion, the connecting portion is corresponding to the mounting hole, and the first connecting member passes through the mounting hole to connect to the connecting portion; and the second sealing member is disposed at a side of the mounting hole away from the connecting portion, and the second sealing member covers the mounting hole.

5. The electronic device according to claim 3, wherein a rib is formed at an edge of the first structural member, and in the case that the first structural member and the middle frame enclose the first sound chamber of the sounder, the first sealing member is disposed on a contact surface between the rib and the middle frame, and in the case that the first structural member and the first circuit board enclose the first sound chamber of the sounder, the first sealing member is disposed on a contact surface between the rib and the first circuit board.

6. The electronic device according to claim 3, further comprising:

a flexible circuit board, wherein in the case that the first structural member and the middle frame enclose the first sound chamber of the sounder, part of the flexible circuit board passes between the first sealing member and the middle frame to enter the first sound chamber, so as to electrically connect to the first circuit board.

7. The electronic device according to claim 3, further comprising:

a flexible circuit board, wherein in the case that the first structural member and the first circuit board enclose the first sound chamber of the sounder, a notch is provided on the first structural member, part of the first circuit board is exposed from the first structural member via the notch, and the flexible circuit board is connected to the part of the first circuit board exposed via the notch.

8. The electronic device according to claim 3, further comprising a third sealing member, wherein in the case that the first structural member and the first circuit board enclose the first sound chamber of the sounder, the first circuit board and the middle frame are hermetically connected by the third sealing member.

9. The electronic device according to claim 8, wherein the first sealing member and the third sealing member are foam.

10. The electronic device according to claim 1, wherein the first structural member is further provided with a leak hole, the leak hole communicates with the first sound chamber, and a damping screen is disposed in the leak hole.

11. The electronic device according to claim 1, wherein a third sealing member is further provided on a contact surface between the camera and the first structural member.

* * * * *